United States Patent [19]

Raith

[11] Patent Number: 6,044,270

[45] Date of Patent: Mar. 28, 2000

[54] APPARATUSES AND METHODS FOR SIGNAL STRENGTH MEASUREMENT IN A WIRELESS COMMUNICATION SYSTEM

[75] Inventor: Alex Krister Raith, Durham, N.C.

[73] Assignee: Telefonaktiengesellschaft LM Ericsson, Stockholm, Sweden

[21] Appl. No.: 08/725,640

[22] Filed: Oct. 15, 1996

Related U.S. Application Data

[63] Continuation-in-part of application No. 08/544,841, Oct. 18, 1995.

[51] Int. Cl.[7] .................................................... H04Q 7/20
[52] U.S. Cl. ........................................ 455/434; 455/437
[58] Field of Search ................................. 455/67.1, 67.3, 455/226.1, 226.2, 422, 437, 450, 63, 524, 436, 434, 515; 370/347, 336–337

[56] References Cited

U.S. PATENT DOCUMENTS

| | | | |
|---|---|---|---|
| 4,887,265 | 12/1989 | Felix | 370/94.1 |
| 4,916,691 | 4/1990 | Goodman | 370/60 |
| 5,175,867 | 12/1992 | Wejke et al. | 455/33.1 |
| 5,353,332 | 10/1994 | Raith et al. | 379/59 |
| 5,375,123 | 12/1994 | Andersson et al. | 455/437 |
| 5,404,573 | 4/1995 | Yabe et al. | 455/423 |
| 5,483,668 | 1/1996 | Malkamaki et al. | 455/33.2 |
| 5,596,318 | 1/1997 | Mitchell | 455/15 |

FOREIGN PATENT DOCUMENTS

| | | |
|---|---|---|
| 399612 | 11/1990 | European Pat. Off. . |
| 458768 | 11/1991 | European Pat. Off. . |
| 530165 | 3/1993 | European Pat. Off. . |
| WO97/15169 | 4/1997 | WIPO . |
| WO97/25827 | 7/1997 | WIPO . |

OTHER PUBLICATIONS

International Search Report re PCT/SE97/01701 Date of Mailing of International Search Report: Apr. 16, 1988.
"Cellular System Dual–Mode Mobile Station—Base Station Compatibility Standard", *EIA/TIA Interim Standard, IS–54–B*, pertinent pages only, Apr. 1992.
K. Felix, "Packet Switching in Digital Cellular Systems", *Proc. 38th IEEE Vehicular Technology Conf*, pp. 414–418, Jun. 1988.
P. Decker et al., "A General Packet Radio Service Proposed for GSM", *GSM in a Future Competitive Environment*, Helsinki, Finland, pp. 1–20, Oct. 13, 1993.
P. Decker, "Packet Radio in GSM", *European Telecommunications Standards Institute (ETSI)*, T Doc SMG 4 58/93, pp. 1–13 (odd pages only), Feb. 12, 1993.
J. Hämäläinen et al., "Packet Data Over GSM Network", T Doc SMG 1 238/93, *ETSI*, pp. 1–8, Sep. 28, 1993.

*Primary Examiner*—Nguyen Vo
*Attorney, Agent, or Firm*—Burns, Doane, Swecker & Mathis, L.L.P.

[57] ABSTRACT

Methods and devices for measuring signal strengths by mobile stations in a wireless communication system are described. More particularly, while transmitting and receiving on a channel, signal strength measurements may be required. For instance, the received signal strength of broadcast information slots at the beginning of a superframe may be measured at predetermined times for several carriers. However, the mobile station may be busy performing information reception or transmission tasks. According to one exemplary embodiment, the signal strength measurements may be delayed when the mobile is transmitting and receiving on a channel, and then more frequent signal strength measurements may be made when there is no communication. In other words, the signal strength measurements do not have to occur uniformly in time, but may be more frequently performed if they have been delayed. Alternatively, the mobile station can "steal" one or more time slots to perform the signal strength measurements by ignoring its tasks of receiving and/or transmitting information.

9 Claims, 4 Drawing Sheets

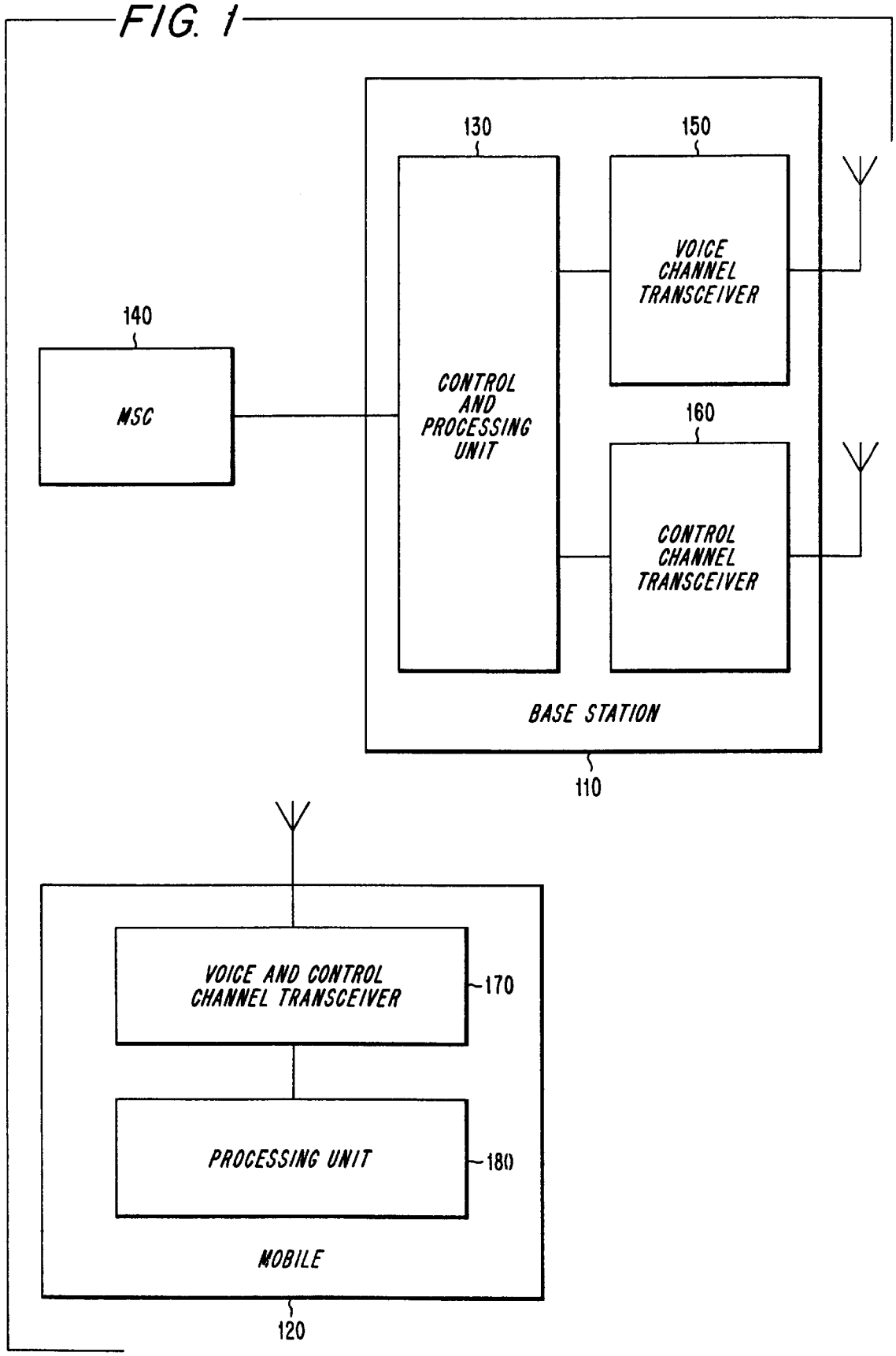

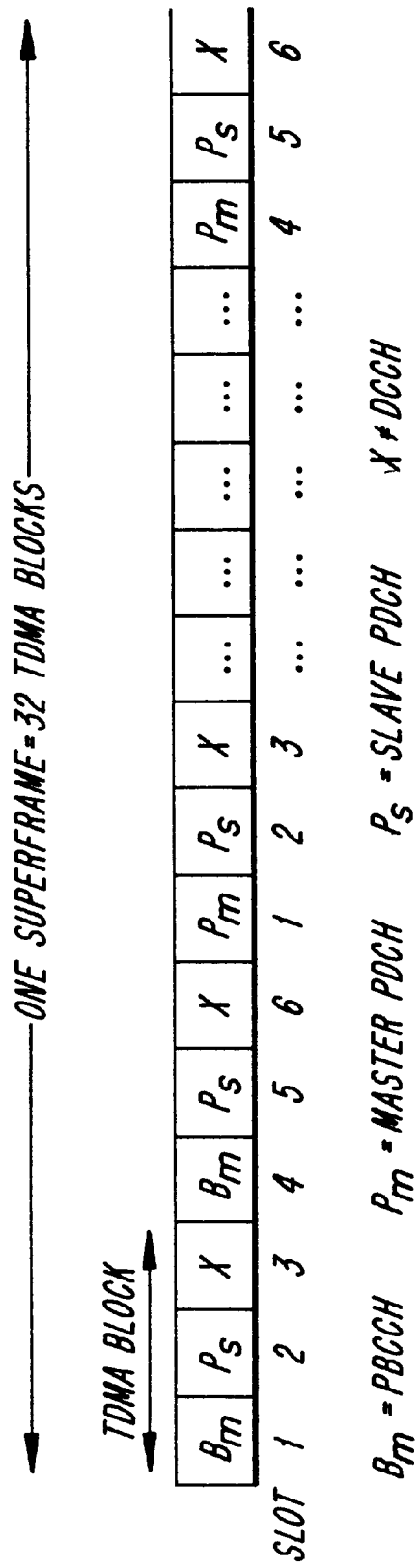
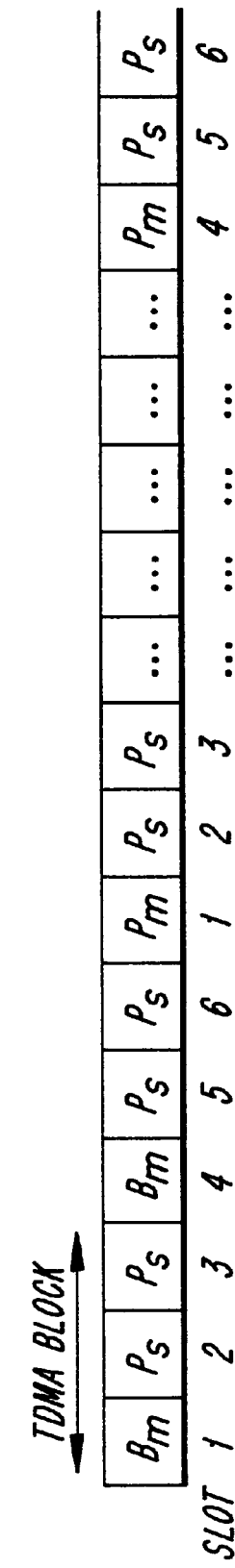

APPARATUSES AND METHODS FOR SIGNAL STRENGTH MEASUREMENT IN A WIRELESS COMMUNICATION SYSTEM

RELATED APPLICATION

This application is a continuation-in-part of U.S. patent application Ser. No.08/544,841 entitled "Inhibiting and Controlling Signal Strength Measurements by a Mobile Station in a Wireless Communication System", filed on Oct. 18, 1995, the disclosure of which is expressly incorporated here by reference.

BACKGROUND

Applicants' invention relates generally to telecommunication, and more particularly, to wireless communication systems, such as cellular and satellite radio systems, wherein signal strength measurements are performed.

In North America, digital communication and multiple access techniques such as TDMA are currently provided by a digital cellular radiotelephone system called the digital advanced mobile phone service (D-AMPS), some of the characteristics of which are specified in the interim standard TIA/EIA/IS-54-B, "Dual-Mode Mobile Station-Base Station Compatibility Standard", published by the Telecommunications Industry Association and Electronic Industries Association (TIA/EIA).

In a TDMA cellular radiotelephone system, each radio channel is divided into a series of time slots, each of which contains a burst of information from a data source, e.g., a digitally encoded portion of a voice conversation. The time slots are grouped into successive TDMA frames having a predetermined duration. The number of time slots in each TDMA frame is related to the number of different users that can simultaneously share the radio channel. If each slot in a TDMA frame is assigned to a different user, the duration of a TDMA frame is the minimum amount of time between successive time slots assigned to the same user.

The successive time slots assigned to the same user, which are usually not consecutive time slots on the radio carrier, constitute the user's digital traffic channel, which may be considered a logical channel assigned to the user. As described in more detail below, digital control channels (DCCHs) can also be provided for communicating control signals, and such a DCCH is a logical channel formed by a succession of usually non-consecutive time slots on the radio carrier.

In only one of many possible embodiments of a TDMA system as described above, the TIA/EIA/IS-54-B standard provided that each TDMA frame consists of six consecutive time slots and has a duration of 40 milliseconds (msec). Thus, each radio channel can carry from three to six DTCs (e.g., three to six telephone conversations), depending on the source rates of the speech coder/decoders (codecs) used to digitally encode the conversations. Such speech codecs can operate at either full-rate or half-rate. A full-rate DTC requires twice as many time slots in a given time period as a half-rate DTC, and in TIA/EIA/IS-54B, each full-rate DTC uses two slots of each TDMA frame, i.e., the first and fourth, second and fifth, or third and sixth of a TDMA frame's six slots. Each half-rate DTC uses one time slot of each TDMA frame. Double and triple rate communications can also be provided as illustrated in the table below.

| Number of Slots | Used Slots | Rate |
| --- | --- | --- |
| 1 | 1 | half |
| 2 | 1,4 | full |
| 4 | 1,4,2,5 | double |
| 6 | 1,4,2,5,3,6 | triple |

In cellular communication systems, users are allowed to move from one cell to the next during a call. To maintain call quality, the user is serviced from different base stations, depending on the base station(s) best able to support radiocommunications with that particular user. As a result, there are control mechanisms for handing off the call from one base station to the next, which mechanisms usually require switching from one communications channel to another.

Traditionally, these control mechanisms rely on information obtained from channel energy or signal strength measurements made at the base stations using a scanning receiver to determine when handoffs should be performed. Since some of the first cellular systems used FDMA access schemes, the scanning receiver scanned different frequencies and made signal strength measurements. Measurements from multiple base stations were then examined at a central control point in the radiocommunication network to determine when and where handoffs should occur. These measurements were made only for one link of the communications channel, i.e. the uplink from the user to the base station.

More recently, digital cellular systems have been deployed in which measurements are also made on the downlink, i.e. on transmissions from the base station to the user. These measurements are made by the user's equipment and communicated back to the base station via a control channel. These measurements are referred to as mobile-assisted handoff MAHO) measurements. MAHO measurements are economically feasible because these digital cellular systems are hybrid FDMA/TDMA. Thus, the mobile station would typically receive its downlink signal during one time slot and transmit its uplink signal during another time slot. However, each TDMA frame in these systems typically has more than two time slots, e.g., six or eight time slots per frame. These other time slots are typically allocated for usage as different communication channels as described above. Thus, a mobile station which is connected in this manner to an FDMA/TDMA system will be idle for several time slots during each frame. These idle time slots are available for making MAHO measurements. Thus, the same receiver hardware in the mobile station is used both for receiving the downlink signal and for making MAHO measurements.

In addition to voice or traffic channels, cellular radio communication systems also provide paging/access, or control, channels for carrying call-setup messages between base stations and mobile stations. For example, when in an idle state (i.e., switched on but not making or receiving a call), a mobile station tunes to and then regularly monitors a control channel (generally, the control channel of the cell in which the mobile station is located at that moment) and may receive or initiate a call through the corresponding base station. When moving between cells while in the idle state, the mobile station will eventually "lose" radio connection on the control channel of the "old" cell and tune to the control channel of the "new" cell. The initial tuning and subsequent re-tuning to control channels are both accomplished automatically by scanning all the available control channels at their known frequencies to find the "best" control channel, e.g., the most strongly received control channel. When a control channel with good reception quality is found, the mobile station remains tuned to this channel until the quality deteriorates again. In this way, mobile stations stay "in touch" with the system. In order to accommodate this functionality, mobile stations may also periodically measure the received signal strength of various control channels.

The radiocommunication systems described above, e.g., those specified by the TIA/EIA/IS-54B and TIA/EIA/IS-136 standards, are circuit-switched technology, which is a type of "connection-oriented" communication that establishes a physical call connection and maintains that connection for as long as the communicating end-systems have data to exchange. The direct connection of a circuit switch serves as an open pipeline, permitting the end-systems to use the circuit for whatever they deem appropriate. While circuit-switched data communication may be well suited to constant-bandwidth applications, it is relatively inefficient for low-bandwidth and "bursty" applications.

Packet-switched technology, which may be connection-oriented (e.g., X.25) or "connectionless" (e.g., the Internet Protocol, "IP"), does not require the set-up and tear-down of a physical connection, which is in marked contrast to circuit-switched technology. This increases the efficiency of a channel in handling relatively short, bursty, or interactive transactions by multiplexing many users. A connectionless packet-switched network distributes the routing functions to multiple routing sites, thereby avoiding possible traffic bottlenecks that could occur when using a central switching hub. Data is "packetized" with the appropriate end-system addressing and then transmitted in independent units along the data path. Intermediate systems, sometimes called "routers", stationed between the communicating end-systems make decisions about the most appropriate route to take on a per packet basis. Routing decisions are based on a number of characteristics, including: least-cost route or cost metric; capacity of the link; number of packets waiting for transmission; security requirements for the link; and intermediate system (node) operational status.

Packet transmission along a route that takes into consideration path metrics, as opposed to a single circuit set up, offers application and communications flexibility. It is also how most standard local area networks (LANs) and wide area networks (WANs) have evolved in the corporate environment. Packet switching is appropriate for data communications because many of the applications and devices used, such as keyboard terminals, are interactive and transmit data in bursts. Instead of a channel being idle while a user inputs more data into the terminal or pauses to think about a problem, packet switching interleaves multiple transmissions from several terminals onto the channel.

Packet data provides more network robustness due to path independence and the routers' ability to select alternative paths in the event of network node failure. Packet switching, therefore, allows for more efficient use of the network lines. Packet technology offers the option of billing the end user based on amount of data transmitted instead of connection time. If the end user's application has been designed to make efficient use of the air link, then the number of packets transmitted will be minimal. If each individual user's traffic is held to a minimum, then the service provider has effectively increased network capacity.

Packet networks, like the Internet or a corporate LAN, are integral parts of today's business and communications environments. As mobile computing becomes pervasive in these environments, wireless service providers such as those using TIA/EIA/IS-136 are best positioned to provide access to these networks. Nevertheless, the data services provided by or proposed for cellular systems are generally based on the circuit-switched mode of operation, using a dedicated radio channel for each active mobile user.

For either conventional "connection-oriented" voice or data radiocommunication or packet data radiocommunication, it may periodically be desirable for a mobile station to receive or transmit information at a rate which occupies its transceiver during all or many of the time slots available in a frame, e.g., double or triple rate communication described above. During these periods, the periodic signal strength measurements which have been requested, either for MAHO or cell reselection purposes, cannot be performed. Thus, techniques and mechanisms are necessary to provide the system with the requested signal strength information, while also accommodating high bandwidth communication.

SUMMARY

In accordance with one exemplary aspect of the invention, a method for measuring signal strengths by mobile stations in a wireless communication system is provided which accommodates high bandwidth downlink traffic channels and minimizes complexity. More particularly, while transmitting and receiving on a channel, scheduled signal strength measurements may also be required. To accommodate high bandwidth transmission and/or reception, the required signal strength measurements may be scheduled by a mobile station at times which minimize interference with the tasks of transmitting and receiving messages. For example, scheduled signal strength measurements may be delayed when the mobile is transmitting and receiving on a channel, and then more frequent signal strength measurements may be made when the mobile station subsequently becomes idle. In other words, the signal strength measurements do not have to occur uniformly in time, but may be more frequently performed if they have been delayed.

According to another exemplary aspect of the present invention, a mobile station may ignore its normal responsibility to receive a frame of data and, instead, make measurements during the "stolen" frame. If necessary, retransmission protocols can be invoked so that the information which the mobile station omitted during the "stolen" frame can be received later. Frame stealing can be scheduled or unscheduled.

BRIEF DESCRIPTION OF THE DRAWINGS

The features and advantages of Applicants' invention will be understood by reading this description in conjunction with the drawings in which:

FIG. 1 is a block diagram of an exemplary cellular mobile radiotelephone system, including an exemplary base station and mobile station;

FIG. 2A is an illustration of a superframe format and time slot utilization for a double-rate packet data connection;

FIG. 2B is an illustration of a superframe format and time slot utilization for a triple-rate packet data connection;

DETAILED DESCRIPTION

Figure 3:
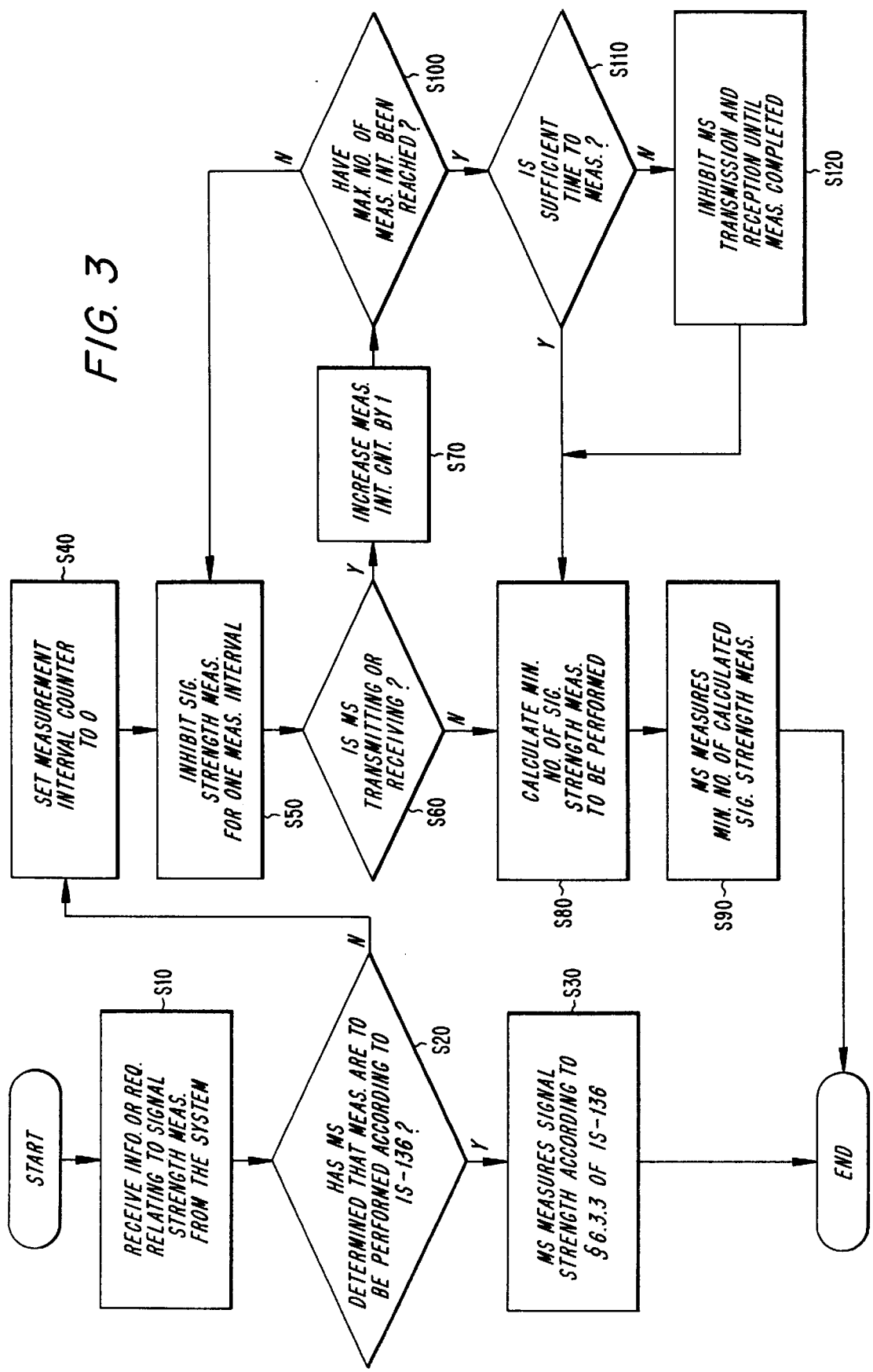
FIG. 3 is a flow chart illustrating the steps of a method for performing signal strength measurements according to one exemplary embodiment of the present invention.

Prior to describing techniques and mechanisms for measuring signal strength according to the present invention, a brief description of equipment which can be used to implement a radiocommunication system is provided for context.

Initially, it should be understood that various exemplary embodiments are described below, some of which relate primarily to packet data communication, others of which relate primarily to non-packet data communication, e.g., voice or data, and still others of which can be implemented for both types of systems. In order to aid the reader in understanding which types of systems are being referenced, the following terminology is used herein. Digital traffic channels (DTCs) are used to refer to channels which are used to support non-packet data connections. By way of contrast packet data channels (PDCHs) are used to refer to channels which support packet data communications.

FIG. 1 represents a block diagram of an exemplary cellular mobile radiotelephone system, including an exemplary base station 110 and mobile station 120. The base station includes a control and processing unit 130 which is connected to the MSC 140 which in turn is connected to the PSTN (not shown). General aspects of such cellular radiotelephone systems are known in the art, as described by U.S. Pat. No. 5,175,867 to Wejke et al., entitled "Neighbor-Assisted Handoff in a Cellular Communication System".

The base station 110 handles a plurality of voice channels through a traffic channel transceiver 150, which is controlled by the control and processing unit 130. Also, each base station includes a control channel transceiver 160, which may be capable of handling more than one control channel. The control channel transceiver 160 is controlled by the control and processing unit 130. The control channel transceiver 160 broadcasts control information over the control channel of the base station or cell to mobiles locked to that control channel. It will be understood that the transceivers 150 and 160 can be implemented as a single device, like the traffic and control transceiver 170, for use with DTCs (or PDCHs) that share the same radio carrier frequency.

The mobile station 120 receives the information transmitted on a control channel at its traffic and control channel transceiver 170. Then, the processing, unit 180 evaluates the received control channel information, which includes the characteristics of cells that are candidates for the mobile station to lock on to, and determines on which cell the mobile should lock. Advantageously, the received control channel information not only includes absolute information concerning the cell with which it is associated, but also contains relative information concerning other cells proximate to the cell with which the control channel is associated, as described in U.S. Pat. No. 5,353,332 to Raith et al., entitled "Method and Apparatus for Communication Control in a Radiotelephone System".

Consider an exemplary situation wherein a mobile station is receiving or transmitting packet data information in each time slot of several consecutive frames, i.e., all six time slots of several IS-136 specified frames. Those skilled in the art will appreciate that either double-rate or triple-rate reception or transmission may suffice to occupy the mobile station's transceiver for all available time slots. Also suppose that this mobile station has received a list of channels on which it is to measure signal strengths, e.g., over the fast associated control channel (FACCH). Since the mobile has no idle time to make the requested measurements, known signal strength measurement techniques cannot perform the required signal strength measurements using only one receiver.

One possible solution for obtaining the required signal strength measurements while a mobile station is busy transmitting or receiving is to provide two receivers, one for receiving packet data information on a PDCH and the other for measuring signal strengths. However, this solution is not desirable since the mobile station is made more costly and complex.

According to one exemplary embodiment of the present invention, measurements of signal strengths by mobile stations for purposes such as MAHO or cell reselection can be controlled so that the available time on a channel is optimally used for transmitting, receiving and measuring. More specifically, when the mobile station is busy transmitting and receiving on a packet data channel, requested signal strength measurements are scheduled around transmitting and receiving tasks.

Therefore, in accordance with one exemplary embodiment of the present invention, when the mobile station is transmitting and receiving on one packet data channel, a technique for scheduling time to measure received signal strengths is provided. For example, at the beginning of a superframe, certain time slots being transmitted on a PDCH may be available to perform the signal strength measurements. Such slots may be treated as idle slots, because they repeat information which the mobile station has previously acquired. In a specific example for packet data, the packet broadcast control channel (PBCCH) slots (which is a control channel multiplexed onto the PDCH) may be utilized to perform part of the signal strength measurements while receiving a message in the PDCH active state. For example, as illustrated in FIG. 2A, a double-rate connection provides PBCCH slots in both slots 1 and 4 of the superframe. Similarly, in FIG. 2B, a triple-rate connection also provides PBCCH slots in both slots 1 and 4 of the superframe. While this technique may be used while the mobile station is receiving, it should be noted, however, that when the mobile station is transmitting at double- or triple-rate, it must monitor the packet channel feedback (PCF) channel which is also sent on the PBCCH slots. As a result, received signal strengths should be measured according to this exemplary embodiment during periods when no transmission by the mobile station is taking place.

In another exemplary embodiment of this invention related to packet data communication, scheduled signal strength measurements may be delayed and then be made more frequently for a period after they resume so as to obtain the required number of signal strength measurements. For example, information relating to the required signal strength measurements (such as how often to perform the measurements) may be transmitted to the mobile. Packet data communication tends to be "bursty" in nature, i.e., the mobile station may receive or transmit several consecutive packets, followed by a period of no reception or transmission. Accordingly, signal strength measurements may be delayed when there is no time available for carrying them out, and then more frequent signal strength measurements may be made when time is available (i.e., the signal strength measurements are packed together more closely in time). As a result, the processor of a mobile station using full-, double-, or triple-rate transmission schedules the signal strength measurements so as to minimize interference with the reception of messages by the mobile and/or the transmission of messages by the mobile.

In an example for packet data, the mobile station may perform signal strength measurements as set forth in Section 6.3.3 of IS-136 on an assigned PDCH with the assigned PDCH treated as if it were the current DCCH. For channels other than the assigned PDCH, the mobile station may perform signal strength measurements according to one of two techniques. In the first technique, the signal strength measurements may be performed according to Section 6.3.3 of IS-136 which may, depending on the rate, require another receiver. In the second technique, the signal strength measurements may be inhibited during a measurement interval ($\Omega$), which may be preset or sent to the mobile in a message on the PBCCH, while the mobile is in the process of receiving or transmitting a message for up to a maximum number, e.g., eight, of measurement intervals. The maximum number of measurement intervals may be a predetermined value or a value received in a PBCCH message, for example. The reader interested in more information regarding exemplary ways in which measurement intervals can be determined is directed to U.S. Pat. No. 5,539,748 to Raith. During the measurement interval when the signal strength measurements resume (which may or may not require stopping mobile station transmission), the mobile station advantageously performs a minimum number ($\beta$) of measurements per entry in the channel measurement list where:

$\beta = \min \{4, \Omega\}$ for entries marked with HL—FREQ=HIGH (1)

$\beta = \min \{2, \Omega\}$ for entries marked with HL—FREQ=LOW (2)

For those readers interested in more details regarding exemplary techniques for informing the mobile station as to how and when these types of measurements are to be performed (including a discussion of HL—FREQ), reference is made to U.S. Pat. No. 5,539,748.

The signal strength measurement techniques may be varied by the mobile: station as explained above, particularly for measuring signal strengths by mobile stations using double- or triple-rate transmission and packet data modes. Since packet data transmission and reception are usually performed in "bursts" (not time slot bursts) due to the nature of packet communication, spare time for signal strength measurements is typically available.

FIG. 3 is a flow chart illustrating the steps of a method for performing signal strength measurements by the mobile station according to an exemplary embodiment of the invention. At step S10, the mobile station receives information or requirements relating to signal strength measurements from the system. At step S20, the mobile station determines whether measurements are to be performed in a conventional manner during available idle time (according to IS-136 for example) based on factors such as the transmission rate or design of the mobile station. When signal strength measurements are to be performed in this way, the mobile station measures the signal strength, according to §6.3.3 of IS-136 for example, at step S30.

If the mobile station determines that measurements are not to be performed during idle time according to IS-136 at step S20, a measurement interval counter is set to zero at step S40 and then the signal strength measurements are inhibited for one measurement interval at step S50. Whether the mobile station is transmitting or receiving is determined at step S60. If the mobile station is not transmitting or receiving, the minimum number of signal strength measurements to be performed is determined by the processor of the mobile station at step S80 according to equations 1 and 2 above, for example. Then, the mobile station performs the minimum number of signal strength measurements at step S90.

If the mobile station is determined to be transmitting or receiving at step S60, the measurement interval counter is increased by one at step S70 and whether the maximum number of measurement intervals have been reached is determined at step S100. If the maximum number of measurement intervals have not been reached, the process returns to step S50 and inhibits the signal strength measurements for another measurement interval. If the maximum number of measurement intervals have been reached, a determination is made at step S110 as to whether there is a sufficient amount of time to perform signal strength measurements. If there is not a sufficient amount of time to perform the signal strength measurements, reception or transmission by the mobile station is inhibited at step S120 until the required signal strength measurements are completed. If a sufficient amount of time for signal strength measurements is determined to be available at step S110, the minimum number of measurements are calculated at S80.

According to another exemplary embodiment of the present invention, another possible solution to accommodate high bandwidth communication and channel measurement is a so-called "slot stealing" technique, in which the mobile station "steals" one or more slots from the transmission/reception time to perform the signal strength measurements due to a lack of sufficient idle time to make conventional measurements. This exemplary embodiment can be employed during any dedicated connection-oriented connection, e.g., a mobile station that is connected via a DTC. Alternatively, this exemplary embodiment may also be applicable to situations wherein a length "burst" is occurring on a PDCH.

According to this exemplary embodiment, the mobile station omits reading its assigned traffic channel in order to perform measurements on other channels. Exemplary types of slot stealing include "wild" stealing, wherein the mobile station autonomously decides which slot or slots to steal, and scheduled stealing, wherein the system knows when the mobile station will omit reading of its assigned traffic channel. Scheduled stealing provides the opportunity for the system to stop transmitting when it knows that the mobile station will not be reading its assigned traffic channel and may be advantageous when the channel quality is poor, i.e., since the retransmission window is fully available for data which was not properly received. Wild stealing, on the other hand, offers a less complicated technique for providing channel measurement opportunities.

Although, for wild stealing, the system will not control the mobile station's selection of particular slots or frames to steal for measurement purpose, some measurement guidelines should be implemented to ensure that the mobile station provides accurate and timely measurement information, while at the same time minimizing the effect of stealing on its ongoing double- or triple-rate communication connection. For example, consider an exemplary system wherein the retransmission protocol and interleaving provide that data transmitted in each time slot carries two radio link protocol (RLP) frames. For such a system, some predetermined maximum number of omitted RLP frames per some predetermined time interval should be established to limit the impact on the retransmission window. As an example, a threshold of 8 omitted RLP frames per second could be established for double-rate connections, while a threshold of 16 omitted RLP frames per second could be established for triple-rate connections. The double-rate threshold may be lower than that provided for the triple-rate threshold if some idle slots are available at double-rate, e.g., if the mobile station hs independent receive and transmit capabilities. Those skilled in the art will also appreciate that it may be desirable to have the same criteria in the uplink as in the downlink, or that it may be desirable to establish independent criteria for the uplink and the downlink.

According to this exemplary embodiment, the mobile station has an opportunity to use its receiver for measurement purposes, slot stealing allows specification of a minimum number of samples per entry in the channel measurement list can be established, e.g., six measurements per channel per second if 12 or fewer channels are in the list or four measurements per channel per second if 13 or more channels are in the list, to ensure sufficient measurement information. Similarly, the measurements can be required to be spaced sufficiently apart in time that the impact of Rayleigh fading is suitably averaged.

Within the boundaries established for a particular system, the mobile station can determine which RLP frames to steal based on its own connection details. For example, if the mobile is transmitting on the uplink in packet data mode, there may be times when no packet data is available for transmission. At these times, the mobile may use one or more uplink time slots to perform downlink measurements. Similarly, if the mobile is transmitting in non-packet data mode, e.g, voice, there may be periods of silence by the mobile user during which there is no "real" data to be transmitted. Although some radiocommunication systems may nonetheless require the mobile station to transmit dummy data, e.g,. related to comfort noise, the mobile station may be programmed to steal time slots in which dummy data would otherwise be transmitted for performing the downlink measurements. Those skilled in the art will appreciate that these are simply examples of ways in which the mobile station can determine optimal slots for wild stealing and that other techniques can also be implemented in accordance with the present invention.

Figure 4:
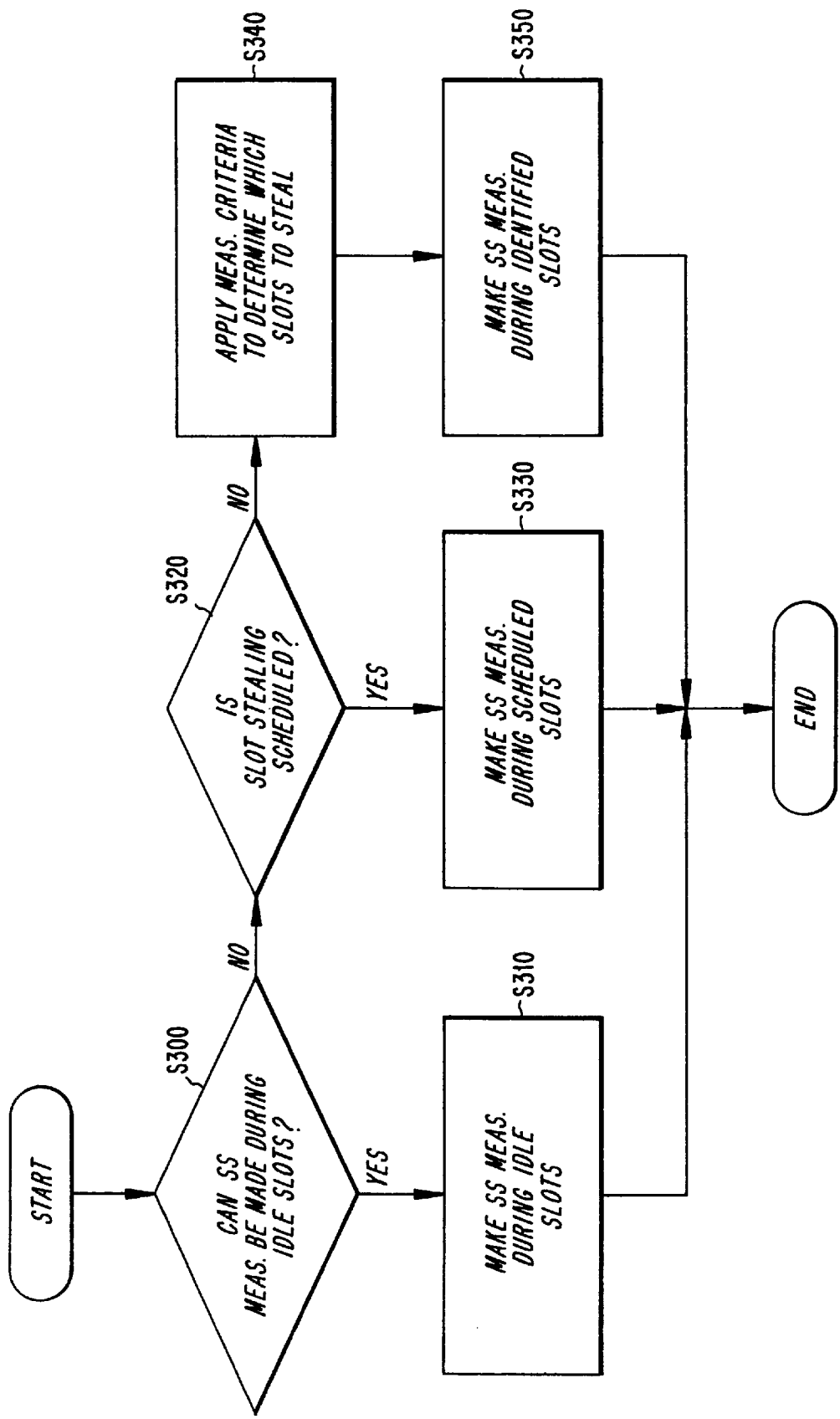
FIG. 4 is a flow chart illustrating the steps of a method for performing signal strength measurements according to another exemplary embodiment of the present invention.

An exemplary method for implementing slot or frame stealing according to the present invention is illustrated by the flow chart of FIG. 4. Therein, at step S300, it is determined whether or not the mobile station has idle slots during which it can make the signal strength measurements, e.g., if it is operating at full rate. If so, then the flow proceeds to step S310, wherein the signal strength measurements are made during the idle time slots. Otherwise, the flow moves to decision block S320, wherein it is determined whether a scheduled stealing plan is in effect. If so, then the mobile station makes the signal strength measurements during the scheduled time slots at step S330. Otherwise, the process moves on to step S340, wherein the mobile station itself identifies one or more upcoming time slots during which it will make signal strength measurements on the listed channels. As described above, this determination can be made taking into account various criteria or rules specified for the system as well as specific considerations relating to this particular mobile's connection with the system. The mobile station then makes the signal strength measurements in the identified slots at step S350. Of course, those skilled in the art will appreciate that the steps S320 and S330 illustrated in FIG. 3 relating to scheduled stealing can be omitted if the system has no provision for scheduled stealing.

The invention being thus described, it will be apparent that the same may be varied in many ways. Such variations are not to be regarded as a departure from the spirit and scope of the invention, and all such modifications are intended to be included within the scope of the following claims.

What is claimed is:

1. A method for making signal strength measurements on a plurality of channels by a mobile station which is communicating with a wireless communication system on another channel, comprising the steps of:

(a) receiving information relating to signal strength measurements to be made by said mobile station on said another channel;

(b) determining whether signal strength measurements can be made during one or more idle slots, and, if said signal strength measurements cannot be made during the one or more idle time slots, determining whether signal strength measurements can be made during one or more stolen slots; and (c) making said signal strength measurements during the determined one or more slots while omitting reception or transmission on the determined one or more time slots.

2. The method of claim 1, wherein said one or more stolen slots are scheduled by said system.

3. The method of claim 1, wherein said one or more stolen slots are selected by said mobile station based on predetermined criteria.

4. The method of claim 2, further comprising the step of:

halting, by said system, transmission of information to said mobile station during said one or more stolen slots.

5. The method of claim 3, further comprising the step of:

requesting, by said mobile station, retransmission of information omitted in step (c).

6. A communication terminal connected to a wireless communication system on a channel, comprising:

means for receiving information on said channel relating to signal strength measurements to be made by said communication terminal on a plurality of other channels; and a processor determining whether signal strength measurements can be made during one or more idle slots and, if said signal strength measurements cannot be made during the one or more idle time slots, determining whether signal strength measurements can be made during one or more stolen slots and making signal strength measurements on the one or more determined slots while omitting reception or transmission on said channel during the one or more determined slots.

7. The communication terminal of claim 6, wherein said one or more stolen slots are assigned by said system.

8. The communication terminal of claim 6, wherein said one or more stolen slots are selected by said communication terminal based one predetermined criteria.

9. The communication terminal of claim 8, further comprising:

means for requesting retransmission of information omitted.

* * * * *